July 28, 1959
R. A. KURTZ
2,896,357
FISH LURE
Filed Sept. 26, 1958
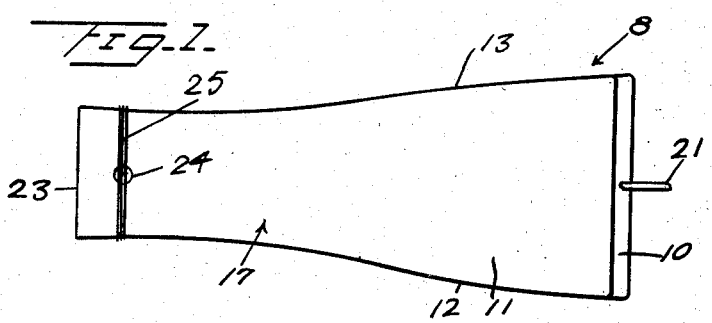
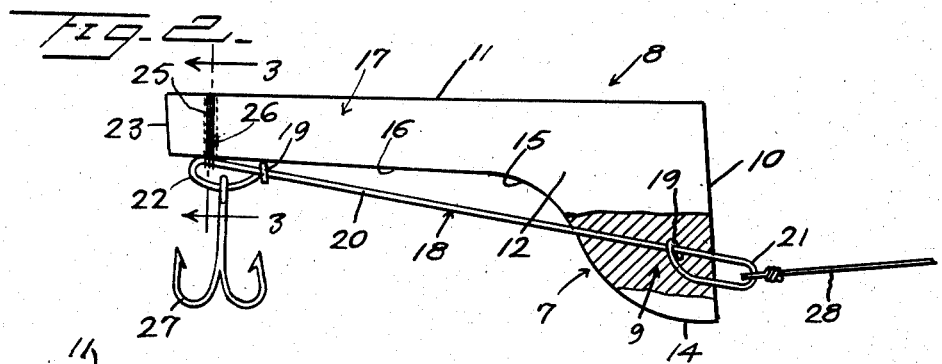
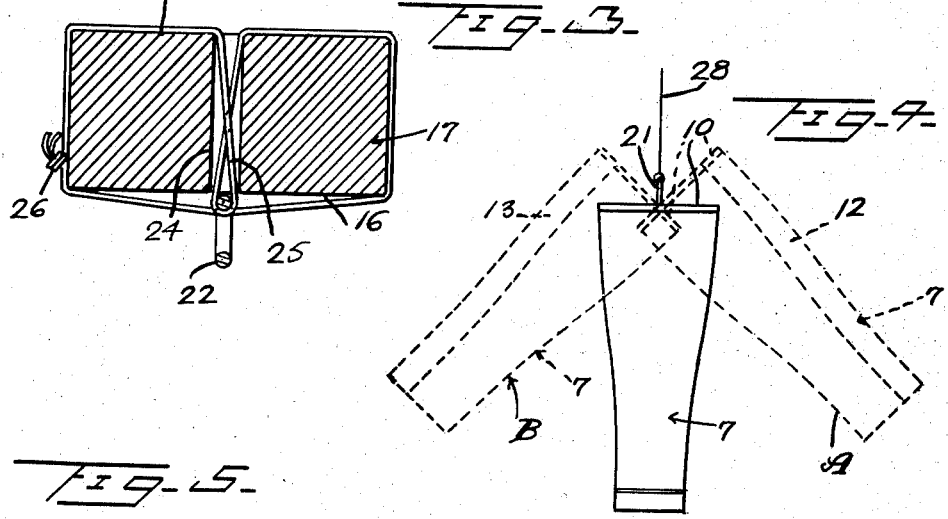
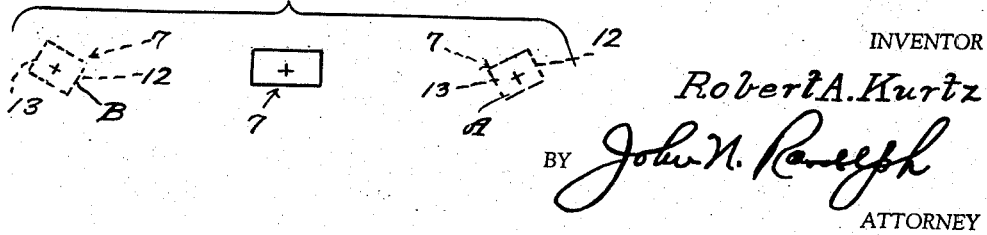
INVENTOR
Robert A. Kurtz
BY John N. Randolph
ATTORNEY

United States Patent Office 2,896,357
Patented July 28, 1959

2,896,357

FISH LURE

Robert A. Kurtz, Ohiopyle, Pa.

Application September 26, 1958, Serial No. 763,534

6 Claims. (Cl. 43—42.36)

This invention relates to a fish lure of novel yet extremely simple construction, which has a unique action, when drawn through the water, such as to excite fish, so that the fish readily strike the lure.

More particularly, it is an object of the invention to provide a lure including a lure body of elongated construction having a forward end defining a face offering resistance to forward movement of the lure through the water and by means of which the lure is initially caused to swing about a connection of the lure to a line or leader, forwardly of said face, to produce a whipping action of the lure.

More particularly, it is an object of the invention to provide a lure which is so constructed that the lure body will have a rolling action as it is whipped back and forth while being drawn through the water.

Still another object of the invention is to provide a lure wherein the swinging and rolling action thereof will cause the lure to zigzag both horizontally and vertically to follow an irregular darting course to very realistically simulate the movements of a wounded and pursued live bait to thus attract and excite fish to strike the lure.

Various other objects and advantages of the invention will hereinafter become more fully apparent from the following description of the drawing, illustrating a presently preferred embodiment thereof, and wherein:

Figure 1 is a top plan view of the lure, on an enlarged scale, relative to the actual size thereof;

Figure 2 is a side elevational view, partly in section thereof, and showing a line or leader attached to the lure;

Figure 3 is a cross sectional view taken substantially along a plane as indicated by the line 3—3 of Figure 2, and on a substantially enlarged scale relative to Figure 2;

Figure 4 is a top plan view of the lure on a reduced scale, and showing in dotted lines the approximate extreme positions of swinging movement of the lure in both directions, and Figure 5 is a diagrammatic end elevational view showing in full and dotted lines the positions of the trailing end of the lure body as it is advanced through the water.

Referring more specifically to the drawing, the fish lure in its entirety is designated generally 7 and includes a solid lure body designated generally 8 and which is preferably formed of a molded material having a specfic gravity less than the specific gravity of water so that the lure body will be buoyant.

The lure body 8 is elongated, as best seen in Figures 1 and 2, and has a forward end portion forming a head, designated generally 9, which is of a horizontal width and of vertical thickness greater than the remainder of said lure body. The head 9 has a forward end defining a substantially flat face 10 which is slightly inclined upwardly and rearwardly from the bottom to the top edge thereof. The lure body 8 has a substantially flat upper side 11 extending from end-to-end thereof and which is disposed at an obtuse angle of slightly greater than 90° to the face 10.

The lure body 8 has corresponding opposite sides 12 and 13 which are disposed substantially vertical and at right angles to the plane of the upper side 11, and which sides 12 and 13 curve inwardly or toward one another from the front face 10 to adjacent the rear end of the lure body 8, as seen in Figure 1. The head 9 has an underside 14 which is convexly rounded and which extends rearwardly and is curved upwardly from the bottom edge of the face 10 and which terminates at its upper rear end in a reversely or concavely curved portion 15 of the underside. Said portion 15 is of a length substantially less than that of the portion 14 and merges at its rear end with a forward end of a portion 16 of the underside of the lure body. Said portion 16 is substantially flat and extends from the portion 15 to the rear or trailing end of the lure body and is inclined slightly upwardly, so that the portion 16 extends rearwardly in slightly converging relation to the rear portion of the upper side 11, as best seen in Figure 2. The portions 14, 15 and 16 are substantially straight, crosswise thereof. The portion of the lure body from adjacent the forward end of the bottom portion 15 to the rearmost end thereof constitutes the tail portion 17, and is of a length substantially greater than that of the head portion 9 and diminishes in width and thickness from the head portion 9 rearwardly.

The fish lure 7 also includes a heavy gauge wire strand 18 the end portions of which are turned downwardly and back upon themselves and have hook shaped terminals 19 which engage over an elongated straight portion 20 of the strand 18 to provide terminal loops 21 and 22, between which the strand portion 20 extends. A rear half of the forward terminal loop 21 and an adjacent part of the strand portion 20 are embedded in and extend longitudinally through the head 9, as seen in Figure 2. The strand portion 20 is disposed in the head 9 so as to be inclined slightly upwardly toward its rear end, and projects from adjacent the upper rear end of the portion 14 of the underside, beneath and adjacent the lower forward end of the portion 15. The forward half of the front loop 21 projects at a slight angle downwardly and forwardly from the face 10, near the bottom edge thereof.

The tail portion 17, near to but spaced somewhat from its rear end surface 23, and midway between the sides 12 and 13, is provided with a bore 24 extending from top to bottom therethrough. The strand portion 20 is of such a length and is supported at such an incline by the head 9, relative to the lure body 8, that a rear portion of the upper part of the rear loop 22 bears against the under surface portion 16 and extends across the lower end of the bore 24, as seen in Figures 2 and 3. A portion of a fine strand 25 of heavy thread or other strong material is looped around the upper part of the rear loop 22 and the ends thereof extend upwardly through the bore 24. The strand 25 is then wrapped several times around the tail portion 17 and the ends thereof are knotted together, as seen at 26, for securing the rear loop 22 to the underside of the tail portion 17.

A fishhook, preferably a treble hook 27, is attached to and suspended from the rear loop 22. An end of a fishing line or leader 28 is attached to and extends forwardly from the exposed forward half of the front loop 21. Thus, the hook 27 is connected directly to the line or leader 28 by the strand 18, and the lure body 8 is supported on said strand. The strand 18 is disposed midway between the sides 12 and 13 and substantially below the center of gravity of the lure body 8.

When the lure 7 is drawn through the water by the line of leader 28 from left to right, as seen in Figures 1 and 2, pressure of the water against the face 10 will not be exactly equal on each side of the loop 21. Consequently, the lure 7 will swing or whip laterally relative to the line or leader 28 from its full line position of Figure 4, either to the right toward its dotted line position, designated A, or to the left toward its dotted line position B. Assuming that the lure initially swings to the right or toward the position A, since the major portion of the side wall 12 is above the strand 18, the lure will rock about said strand as an axis counterclockwise, as viewed in Figure 5, to assume a canted position as illustrated at A in Figures 4 and 5. From such a canted position, the pressure of the water against the side 12 and the rear under surface portion 16 will cause the lure 7 to then swing in the opposite direction toward the position B, and in so moving the water pressure against the other side 13 will rock the lure 7 in the opposite direction for canting the lure body in the other direction, as seen at B in Figures 4 and 5. The maximum arc in which the lure 7 will swing relative to the line or leader 28 is approximately 90°, as illustrated in Figure 4. It will also be apparent that the water pressure against the face 10, as the face is swung between the positions A and B thereof will cause the lure to dart laterally in one direction or the other and also to be deflected upwardly and downwardly as the face 10 assumes different angles relative to the direction of pull of the lure, as indicated by the line 28 in Figure 4. These various irregular whipping, rolling and darting movements of the lure 7, as it is retrieved, will very realistically simulate the movements of a bait fish which is wounded or being pursued for attracting and exciting game fish to strike the lure.

The under surface 15 and the parts of the bottom portions 14 and 16, located adjacent thereto, provide a cavity beneath the lure body 8, immediately behind the head 9, where the water pressure is less than elsewhere around the lure body, as the lure is drawn forwardly through the water. Consequently, water rushing into this area and exerting a pressure against the underside 16 will tend to produce an up and down fluttering movement of the tail portion of the lure and a change in angle of the face relative to the direction of movement of the lure, which further enhances the darting action. The tail portion 17 is reduced in width and thickness so that it will offer a minimum of resistance to either up and down or lateral swinging movement.

Various modifications and changes are contemplated and may be resorted to, without departing from the function or scope of the invention as hereinafter defined by the appended claims.

I claim as my invention:

1. A fish lure comprising an elongated lure body having a forward portion constituting a head and a rear portion constituting a tail, said head being of greater width and substantially greater thickness than the tail and having a substantially flat front side forming the face of the lure body, said lure body having a substantially flat upper side extending from end-to-end thereof and disposed at an angle, relative to said face, slightly greater than a right angle, said head having an underside convexly rounded, longitudinally of the lure body, and extending rearwardly and upwardly from the bottom edge of said face, said lure body including a concavely rounded longitudinally extending part of the underside forming a continuation of the rounded underside of the head, a line engaging loop partially embedded in said head and having a forward end projecting forwardly from said face, near the bottom edge thereof, a hook attaching loop disposed beneath the rear portion of the tail, and means anchoring said hook attaching loop to the tail, said loops constituting end portions of a wire strand including a substantially straight intermediate portion extending between and connecting said loop and having a forward part embedded in and extending longitudinally through the head and outwardly from the underside thereof.

2. A fish lure as in claim 1, said lure body having corresponding sides each disposed at approximately a right angle to said upper side, said strand being disposed midway between said sides and substantially below the center of gravity of the lure body and being inclined upwardly and rearwardly relative thereto.

3. A fish lure as in claim 2, said tail being of a length substantially greater than the length of the head and having a substantially flat underside extending rearwardly from said concave portion of the underside and being disposed in rearwardly converging relation to the upper side.

4. A fish lure as in claim 3, said corresponding sides being curved inwardly relative to one another from the forward end toward the rear end of the lure body.

5. A fish lure as in claim 1, said tail having a bore extending from top to bottom therethrough, said means comprising a thin strand element engaging the hook attaching loop and extending through said bore and around the tail.

6. A fish lure as in claim 1, said lure body being formed of a molded material having a specific gravity less than that of water.

No references cited.